No. 626,360. Patented June 6, 1899.
D. M. BALDWIN.
DIGGER.
(Application filed Apr. 26, 1898.)

(No Model.) 2 Sheets—Sheet I.

Witnesses
Perry Kingman.
Geo. Johnson.

Inventor
Daniel M. Baldwin
by Townsend Bros.
His Attys.

No. 626,360. Patented June 6, 1899.
D. M. BALDWIN.
DIGGER.
(Application filed Apr. 26, 1898.)
(No Model.) 2 Sheets—Sheet 2.
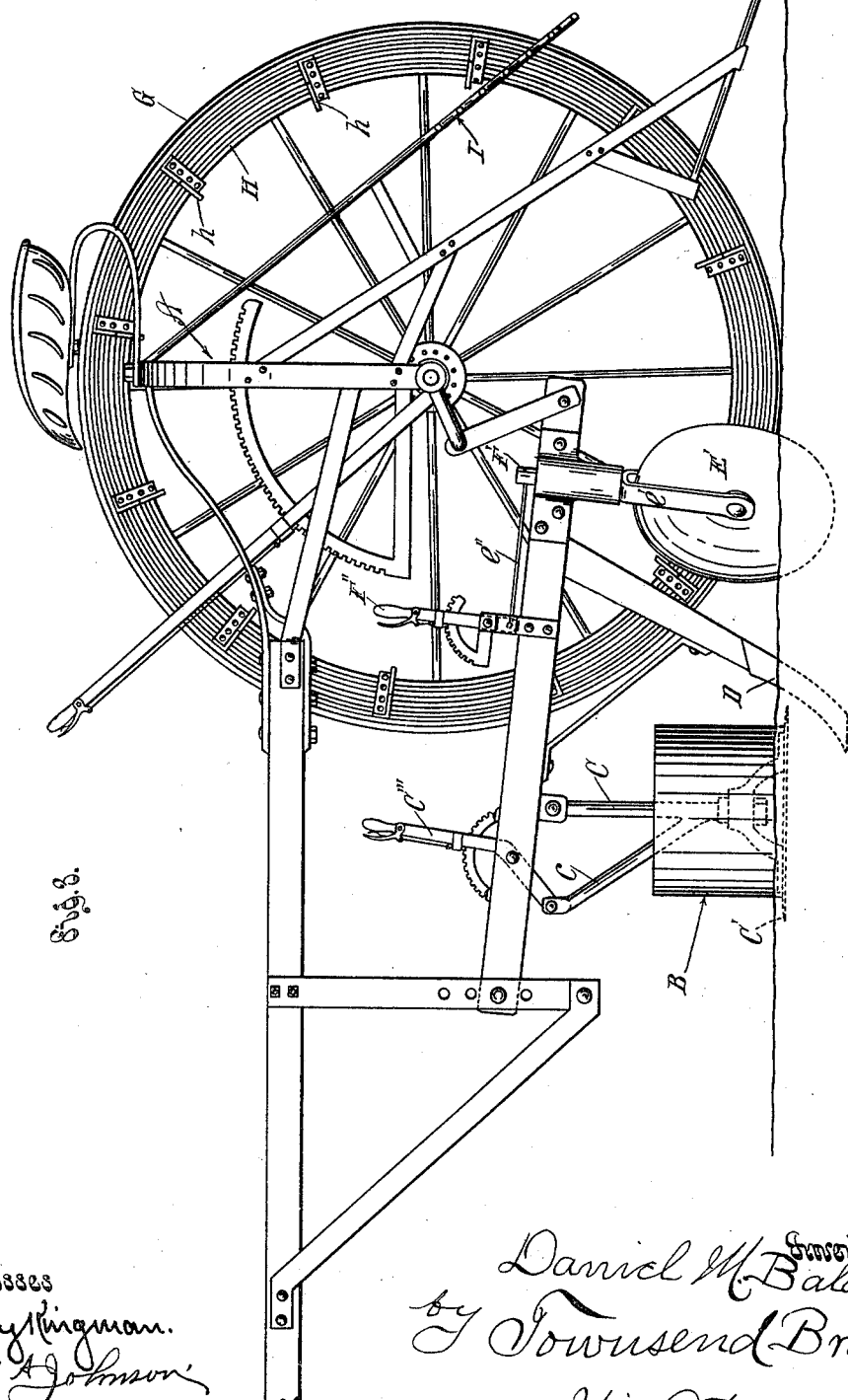
Witnesses
Perry Kingman.
Geo. A. Johnson.
Inventor
Daniel M. Baldwin
by Townsend Bros.
His Attys.

UNITED STATES PATENT OFFICE.

DANIEL M. BALDWIN, OF GRIFFIN, CALIFORNIA.

DIGGER.

SPECIFICATION forming part of Letters Patent No. 626,360, dated June 6, 1899.

Application filed April 26, 1898. Serial No. 678,905. (No model.)

*To all whom it may concern:*

Be it known that I, DANIEL MERRILL BALDWIN, a citizen of the United States, residing at Griffin, in the county of Ventura and State of California, have invented new and useful Improvements in Diggers, of which the following is a specification.

The particular object of my invention is to provide a machine for digging potatoes. It is also adapted for digging beets.

It is a particular object of my invention to provide means whereby the tops of the vegetables and the roots of weeds can be expeditiously severed and thrown to one side, where the supporting-wheels of the machine will firmly hold them out of the way while the operation of digging is progressing.

It is also an object of my invention to provide improved means for screening the vegetables from the soil.

It is a further object of my invention to provide means whereby the width of the land-slices thrown by the digger can be quickly regulated.

My invention comprises the various features of construction and combinations of parts hereinafter set forth and claimed, whereby I accomplish the objects hereinbefore set forth.

The accompanying drawings illustrate my invention.

Figure 1:
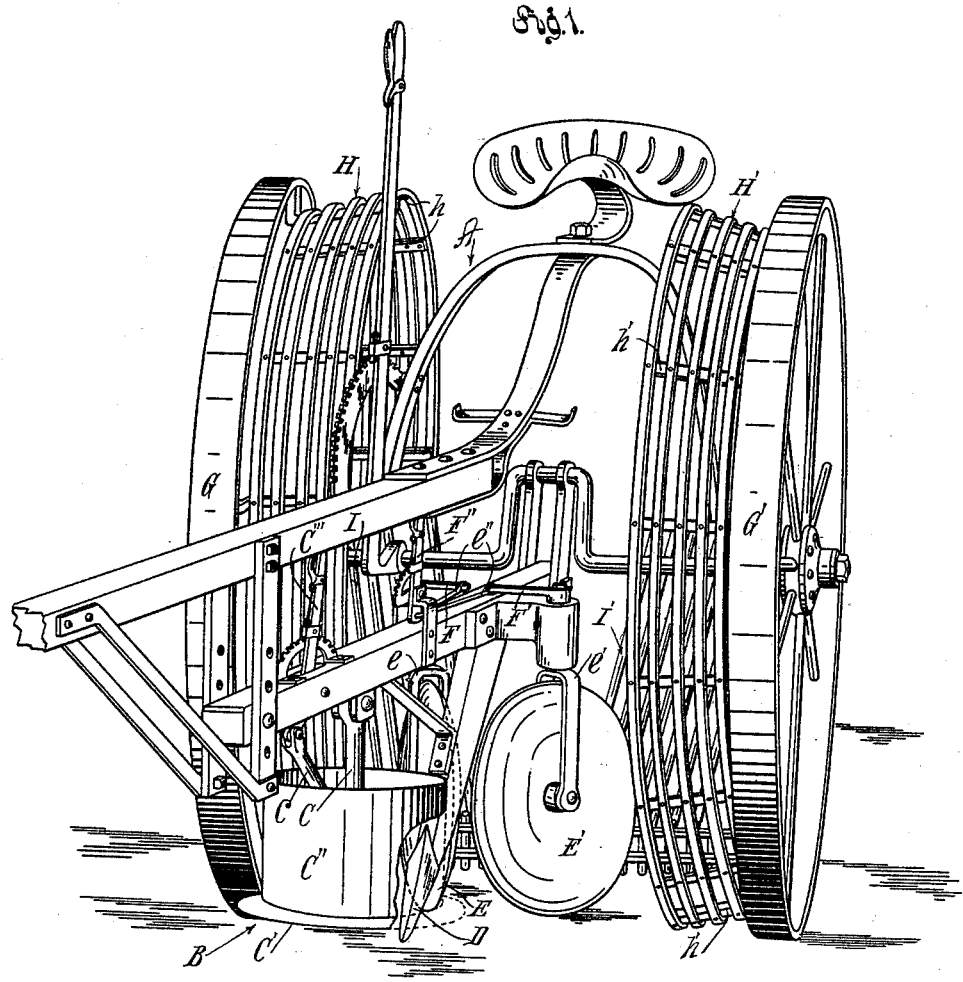
Figure 2:
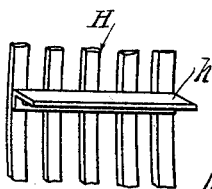

Figure 1 is a perspective view of a machine embodying my invention. Fig. 2 is a fragmental side elevation of one of the revolving gratings, and Fig. 3 is a side elevation with one wheel removed.

In the drawings, A represents the frame of the machine, and B represents my improved furrow-opener and weed-cleaner.

C is a standard which is pivotally secured at its upper end to the frame, and C' is a sharp-edged disk which is journaled upon the lower end of the standard and is adapted to normally lie in a substantially horizontal position.

C" is a fender which, as shown, comprises a tubular body secured to the disk at a short distance from the outer edge thereof and projecting upward therefrom.

C''' is a lever which is connected with the lower end of the standard C by means of a bar $c$ and is adapted to adjust the inclination of the disk C' by swinging the standard back and forth upon its pivotal point.

D is a fluke or fender which is secured to the main frame and is adapted to enter the soil to the depth desired. Beyond this fender are arranged two inclined rotating disks E E', which are wider apart at their bottoms and at their rear edges than they are at their tops and their front edges. Their front edges are arranged behind the shield, and to the tops of the rotatable standards $e\ e'$, which carry the disks, are secured crank arms or levers F F'. The outer ends of these levers are by links $e''$ secured to a lever F", which is pivoted to the frame. By operating the lever the links will be operated to operate the cranks to rotate the standards, and thus throw the rear portion of the disks farther apart or to draw them closer together, thus to gage the width of the furrow-slices thrown.

G G' are supporting-wheels, upon which the frame A is mounted. To each wheel is secured an annular grating H H', respectively. This grating is formed of rods or other suitable material and, as shown in the drawings, is made tapering toward the outside, thus making the plane of the screen stand at an inclination as regards the axis of rotation of the screen.

$h\ h'$ respectively represent ledges for carrying the potatoes or other vegetables dug upward to a point substantially high enough to cause them to drop upon the grills I I', which are secured to the frame of the machine and extend, respectively, forward into the revolving gratings and backward to the rear of the machine.

In practice the parts being assembled, as shown, the machine is drawn forward, the furrow-opener and weed-cleaner C' being set to cut the tops of the vegetables and the roots of the weeds at the desired depth below the surface of the soil, and by reason of the disk being journaled to rotate, whenever a weed or potato-top is struck at one side of the center of the disk the disk revolves in that direction, thus easily severing the root or the top, when it is engaged by the cylindrical fender and is thrown outward into the path of the supporting-wheels, which advance thereupon and hold them firmly upon the ground while the operation of digging is in progress. The shield D breaks the soil in advance of the rotating disks E E' and prevents the disks from cutting the vegetables. The disks in their forward movement cut the land-slices and throw the soil and its contained vegetables into the revolving screens or gratings, when the fine soil immediately passes through the screen and the potatoes and those clods which are too large to pass through the screen are engaged by the ledges and carried upward to a point sufficiently high to cause them to become dislodged from the ledges and to drop upon the grills. This fall is not sufficient to bruise the vegetables, but is sufficient to break most of the clods and allow them to pass through the grill, while the potatoes pass downward along the grill and from the rear end of the machine, being left upon the surface of the soil in convenient position to be picked up.

I am aware that two horizontally-arranged disks revolved toward each other by driving mechanism have been used for severing beet-tops, but no fenders have been provided thereupon, it being necessary to provide stationary fenders behind the cutters in order to dispose of the beet-tops. With such a device clogging cannot be avoided. My device is distinguished from such a device by having the fender secured to the disk and revolving therewith, and, further, by the fact that my disk is journaled to revolve freely in either direction, so that a weed which engages the cutter or fender upon one side will revolve the fender toward that side, and thus be automatically thrown in the direction in which the least resistance is offered to its removal, the body of the fender pushing it into the path of the supporting-wheels and out of the path of the digging device.

Now, having described my invention, what I claim as new, and desire to secure by Letters Patent, is—

1. In a digger, the combination set forth of digging mechanism; and a weed or furrow cleaner arranged in advance of the digging mechanism and comprising a vertically-arranged cylindrical fender-body provided at its bottom with a substantially horizontal annular cutting edge projecting beyond the body, the body being journaled to freely revolve in either direction.

2. In a digger, the combination set forth of digging mechanism; a weed and furrow cleaner comprising a disk arranged in substantially a horizontal position, journaled to revolve and provided with a fender secured to the disk near the edge thereof.

3. In a digger, the combination set forth of digging mechanism; a weed or furrow cleaner comprising a disk arranged in a substantially horizontal position and provided with a fender secured to the disk near the edge thereof; and means for adjusting the inclination of the disk.

4. A weed-cleaner and furrow-opener comprising a cylindrical fender journaled to revolve and provided around its circumference with a cutting edge.

5. A weed-cleaner and furrow-opener comprising a disk journaled to revolve and arranged in substantially a horizontal position; a fender comprising a tubular member riveted to the disk near the edge thereof; and means for adjustably securing the cleaner to the digger-frame.

6. In a digger, the combination set forth of a shield; and two inclined revolving disks with their forward edges arranged behind the shield.

7. In a digger, the combination set forth of a shield; two inclined revolving disks arranged with their front edges behind the shield; and means for adjusting the disks.

8. In a digger, the combination set forth of a shield; two revolving disks having their front edges arranged behind the shield; and revolving gratings arranged to receive the furrow-slices turned by the disks.

9. In a digger, the combination set forth of a shield; two rotary disks arranged with their front edges behind the shield; means for adjusting the disks to produce a wider or narrower furrow; and two revolving gratings arranged to receive the land-slices thrown by the disks.

10. In a digger, the combination set forth of a shield; two rotary disks secured to rotatable standards and arranged with their front edges behind the shield; a crank secured to each standard; a lever for operating the cranks; and links connecting the lever with the cranks.

11. In a digger, the combination set forth of the supporting-wheels each provided with an annular grating; and a rearwardly-extending grill projecting into the grating.

12. In a digger, the combination set forth of the tapering annular grating; and a rearwardly-projecting grill having its front end extending into the grating.

13. In a digger, the combination set forth of a furrow-opener comprising a substantially horizontally-arranged rotating disk provided with a fender; a shield arranged behind the fender; two inclined rotating disks arranged with their front edges behind the shield; and revolving gratings arranged to receive the land-slices thrown by the disks.

14. In a digger, the combination set forth of a weed-cleaner and furrow-opener comprising a substantially horizontally-arranged rotating disk provided with a cylindrical fender; a shield arranged behind the cleaner; two inclined rotating disks arranged with their front edges behind the shield; means for adjusting the disks; two rotating screens arranged to receive the furrow-slice thrown by the disks; and means arranged to conduct the dug vegetables from the screens.

15. In a digger, the combination set forth of the digging mechanism; a standard secured in front of the digging mechanism and pivoted at its top to the frame; a horizontal disk journaled upon the bottom of the standard; a cylindrical fender secured to the disk at a distance from its edge; and means for swinging the standard back or forward to adjust the inclination of the disk.

DANIEL M. BALDWIN.

Witnesses:
ALFRED I. TOWNSEND,
JAMES R. TOWNSEND.